United States Patent Office 3,819,775
Patented June 25, 1974

3,819,775
METHOD OF MAKING POLYMERIC FILM
Richard D. Mules, 4 Wheeler Court, Darley Woods,
Wilmington, Del. 19810
Filed Aug. 15, 1972, Ser. No. 280,890
Int. Cl. B29f 3/08
U.S. Cl. 264—40   3 Claims

ABSTRACT OF THE DISCLOSURE

An apparatus is provided for making polymeric film wherein flowable polymeric material is extruded in molten form through an extrusion die orifice in the form of a web of film and which apparatus includes means for selectively controlling (by heating or cooling) the temperature of isolated parts of the die lips defining the die orifice whereby to improve thickness uniformity of the film. A method also is provided of making this polymeric film of improved thickness uniformity.

BACKGROUND OF THE INVENTION (1) Field of the invention

This invention is a method of an apparatus for making, by extrusion, a web of polymeric film in which molten polymeric material is selectively heated or cooled adjacent the lips of an extrusion die in a novel manner to obtain desired film thickness characteristics.

(2) Description of the Prior Art

There have been numerous attempts to improve thickness properties in extruded films. Numerous apparatus and methods, for example, have evolved to sense thickness deviations and effect adjustment of film thickness at specific locations usually at or near the point of extrusion of the polymeric material in the film forming operation.

For instance, U.S. Pat. 3,122,782 describes a mechanical arrangement for adjusting the thickness of selected hypothetical lanes across a film structure corresponding to thicker or thinner portions of the film. In such patent, two interconnected multiple-junction terminal boards are disposed intermediate a film thickness sensing gauge and an adjustment means for changing the width of the extrusion orifice from whence the film structure issues. The film thickness gauge measures the thickness of the film structure and transmits a bias signal through suitable relay elements for energizing motors which are so constructed and arranged to cause opening or closing of the orifice opening in the extruder in accordance with the deviation in the thickness of the film that is sensed by the film thickness measuring gauge.

A method of improving the thickness uniformity of polymeric film is described in U.S. Pat. 3,161,711 which discloses heating selected longitudinal lanes of greater thickness of amorphous polymeric films followed by cooling the entire film whereby to effect a more marked temperature differential between the thinner and the thicker longitudinal lanes of the film structure, followed, lastly, by stretching the unsupported film structure thereby to obtain a film structure of improved thickness uniformity.

In U.S. Pat. 3,455,175, an extrusion apparatus is disclosed with adjustable lip members containing a plurality of adjustment screws along the orifice slot. The screws are arranged closely together on about 20 mm. (.787 inch) spacing and are threaded into the lip members which have been modified near the extremities by locally weakened cross sections. Manual rotation of the small diameter screws results in displacement of the lip members and by that means the slot opening defining the thickness of the web is varied. Confining the deflection of a lip member to a narrow area approximating the width of a single adjustment screw is most difficult due to the inherent interaction of adjacent screws. Each time the setting of a screw is changed, there is a corresponding unavoidable disturbance of the setting of neighboring screws resulting in an unpredictable deflection of the lip members. To counteract the undesirable deflection, the settings of the neighboring screws must also be corrected. As a consequence, narrow band or streak nonuniformities cannot easily be eliminated without upsetting the basic gauge setting of the lips. As is apparent, adjustment means of this sort require constant personal attention and trial and error manipulation by skilled operating personnel.

Conversely, the difficulties of reliance on skilled operators and trial and error control are to some extent obviated by an automatic gauge control system, such as is disclosed in U.S. Pat. 3,122,784, which features a plurality of speed controlled adjuster motors mechanically coupled to displaceable lip segments on a web extrusion apparatus. The motors respond to signals generated by a traversing thickness sensing means located at some distance below the extrusion apparatus which measures the final thickness of the web from standard reference deviations. Electrical signals are thus generated, translated into thickness corrections and distributed by way of switching means sequentially to the input of the motors. This system cannot, however, eliminate narrow streak and gauge band nonuniformities because the individual adjustment means control relatively wide segments of the orifice slot. Moreover, the nature of the nonuniformities is often too subtle and complex for corrective adjustment by mechanical displacement of die lip members.

In U.S. Pat. 3,161,711 is disclosed a process for improving film thickness uniformity properties which includes heating a substantially amorphous thermoplastic polymeric film while substantially free from tension along at least one selected longitudinal lane of greater thickness than the adjacent thinner portions of the film and cooling the film to sharpen the temperature differential between the thinner and thicker portions, followed by stretching. The heater is positioned after the quench drum and preheat rollers and before the film passes into the first set of nip rolls.

In U.S. Pat. 3,649,726 there is described a thickness control apparatus and method for polymeric film structures including means for and steps of measuring the thickness of the film after stretching, computing the cumulative mass values of the film before and after stretching and adjusting the thickness of the film structure before stretching responsive to deviation from a preselected value in thickness after stretching corresponding to the cumulative mass value of the film before and after stretching. The thickness of the film structure is adjusted before stretching by varying the opening of the orifice lips or by heating means disposed intermediate the cooling means and the stretching means.

And, lastly, U.S. Pat. 3,341,388 discloses a method of an apparatus for extruding thermoplastic film wherein heaters are positioned in the die body whereby to heat those areas of the die to help maintain the thickness of the sheet substantially constant.

While these patents and others show polymeric film thickness-controlling or related devices, they do not show controlling the temperature of isolated lip parts to obtain better thickness properties in the film, as in the instant invention.

SUMMARY OF THE INVENTION

This invention is a method of an apparatus for controlling polymer flow prior to extrusion in making a web of polymeric film having improved physical properties.

In the manufacture of film for a variety of uses, it is known to improve its characteristics by controlling flow of the polymeric material in the extrusion apparatus. Nonetheless, in making such films by many known methods, the film, as formed, usually has one or more zones or areas of greater or lesser thickness than the rest of the film (i.e., gauge variations) which are caused by polymer flow imperfections or variations, which, in turn, create nonuniform patterns of the polymeric material in the extruding device.

In the extrusion of polymeric materials in web form, it is known that gauge or thickness of the film, its unit weight and the roll formation characteristics of the web, sheet or tube, are all directly controlled by or determined by the uniformity of flow of the polymeric material through the extrusion die and other parts of the extrusion apparatus, particularly the die lips. For example, when the web is wound, any continuing, standing gauge variation would lie one atop the other so that in cumulative effect a hard hand is built up, which distorts the roll, thereby impairing its utility and causing waste.

The manufacture of thin gauge polymeric film, for example, from oriented polyester, polyethylene and polypropylene material, usually commences with the formation of a relatively thick web of material extruded in a thermoplastic condition from a narrow elongated extrusion orifice of a flat plate extrusion die. The molten polymeric material is deposited onto a smooth, cooled, endless moving quenching surface, such as a stainless steel conveyor band or a rotary drum and solidified. The hardened material in the form of a web of film is subsequently removed from the cooled surface and forwarded into a stretcher apparatus where it is reheated to just above its glass transition temperature and stretched longitudinally and transversely to the desired thickness. From there, the thin gauge web of film is sent to other processing stations where it may be given a variety of surface treatments depending on the end use, then suitably slit and wound into packages or rolls, in accordance with customer specifications.

The superior physical properties of oriented polyester material are now being exploited in the form of high strength ultra-thin films. These films, ranging from 0.0002 to 0.0010 inch thickness, are finding widespread use in magnetic recording tapes, electrical applications, surface coverings and general thin film packaging. As the material is made in the ultra-thin range, it has been found that gauge nonuniformities become increasingly critical in the formation of a high quality product. Specifically, small variations such as narrow gauge bands and streaks heretofore tolerable are now exceedingly troublesome and defy correction on conventional extrusion apparatus by mere adjustment of the die lips, for example. The origin of these streaks and gauge bands can be traced to numerous sources that in some instances may include the polymer preparation and transfer systems as well as the extrusion die apparatus itself. Still other sources of these nonuniformities are thought to be the result of sporadic surges in the pumping system, uneven heating of the molten material and, even, inherent differences in the composition of the polymeric material.

This invention is directed to a method of an apparatus for making film by extrusion and, more particularly, to a method of an apparatus for controlling the temperature of molten polymeric material in a novel manner in the extruding device by the use of novel isolated die lip parts which assures controlled flow of the polymer and also substantial film thickness uniformity.

By following the method of this invention and by using the novel polymer flow controlling device thereof, polymeric films of excellent properties and gauge uniformities may be produced capable of meeting untold numbers of use requirements.

DESCRIPTION OF THE PREFERRED EMBODIMENTS

Figure 1:
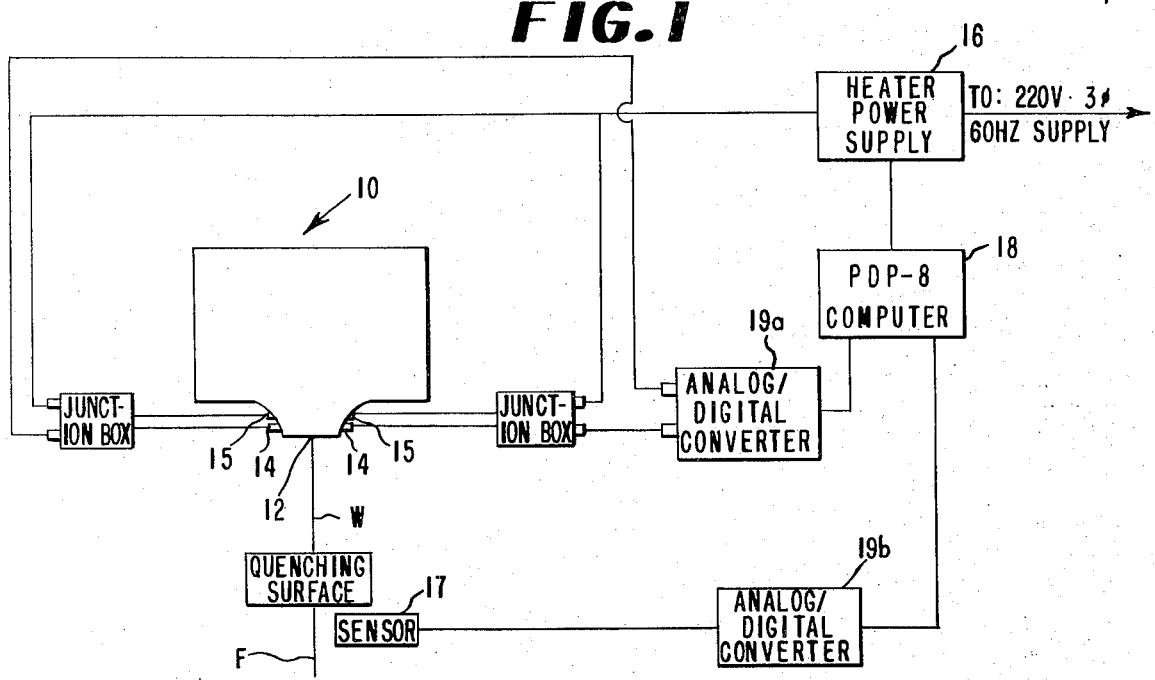
FIG. 1 shows an extrusion die of this invention with vernier heated die lips tied into an automatic closed loop gauge control system (with parts omitted for clarity) for continuous high productivity operation. The system includes a traversing web thickness scanner, an analog-to-digital signal converter, a temperature feedback means on the heated die lips, a power supply interface and a digital computer. In the system, the computer receives web thickness variations and temperature readings from the individual heated parts of the die, differentiates the variations relative to a desired thickness profile and initiates corrective signals to the power interface which regulates electrical power to the heater elements.
Figure 4:
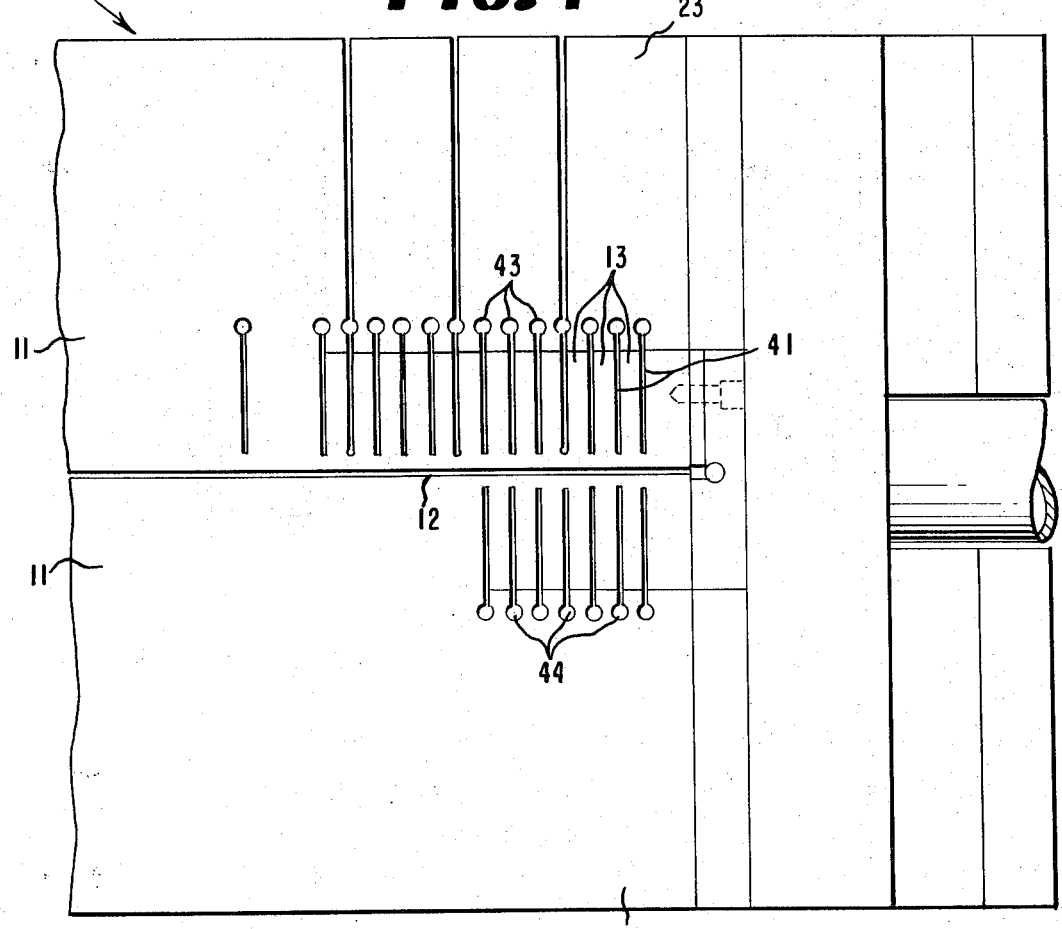
FIG. 4 is a partial front view showing a close-up along the ends of the top and bottom body members.

Referring to the drawing, there is shown an apparatus of this invention for feeding flowable molten polymeric material and extruding it in the form of a web of polymeric material to provide film, such as polyethylene terephthalate film, having enhanced psyhical properties.

Figure 3:
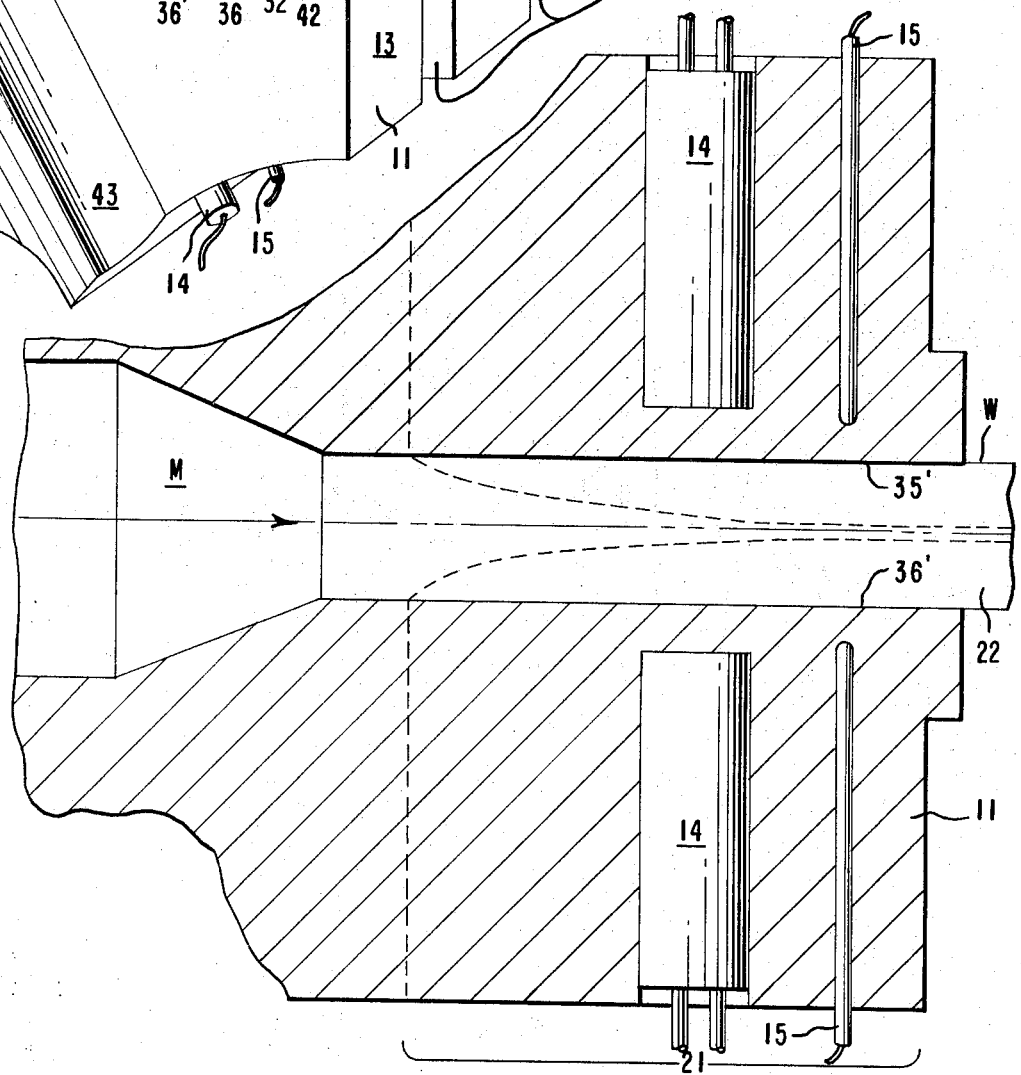
FIG. 3 shows a typical thermal boundary layer formation through the molten stream of polymeric material as it moves, unidirectionally, through the controlling temperature zone wherein the heaters are positioned adjacent the die lip surfaces.

Referring to FIGS. 1 and 3 in particular, it will be seen that polymeric material M is supplied to the apparatus of this invention from a supply source, not shown, and moved or fed into a die adapter through which the material flows to a novel extrusion die 10 of this invention, from which it is extruded in the form of a web W of polymeric material.

The extrusion die 10 includes die lips 11 which define an extrusion orifice 12, with each lip 11 including a plurality of closely spaced heated lip sections or parts 13. Each lip part 13 includes a heater element 14 and a temperature sensor 15 which is connected to an independently controlled by a regulated power supply 16 so that each lip part 13 is substantially thermally isolated from the other. Prior to a production run, the area of influence of each thermal lip part 13 on the web W of polymeric material is identified and calibrated. Power level to selected heated lip parts 13 is then manually adjusted by an operator with the aid of a suitable web gauge measuring device 17. One such device commonly used and commercially available is a beta-ray scanner which is mounted on a traversing mechanism located at some distance downstream of the extrusion die, preferably at a point after the web W of polymeric material has been solidified into a web of film F. The scanner is moved back and forth across the width of the web of film F and records thickness variations which can be displayed conveniently as a thickness profile on a cathode ray tube. By reference to the profile trace, the operator makes appropriate adjustments to the power level of the heaters influencing the area of the gauge variation.

The adjustment of the power level can be either to increase or decrease the temperature of the selected thermal lip part 13 in accordance with the type of defect being corrected. By adjustment of the power level upward, the temperature of the molten stream opposite the selected thermal lip part 13 is raised. This causes a localized decrease in the melt viscosity of the molten material M and a corresponding local increase in the mass flow rate. Because the residence time of the material in contact with the high temperature zone is very brief, no significant degradation of the polymer occurs.

Depending on the composition and behavior of the polymeric material and the desired gauge correction, the heating geometry can be tailored either to increase or to decrease the thickness of the thermal boundary layer or the entire thickness of the material can be raised to an elevated temperature.

Preferably, the extrusion die 10 is operated with all the thermal lip parts 13 initially adjusted to a uniform temperature level slightly higher than the inlet temperature of the molten stream. The temperature of one or more thermal lip parts 13 opposite a web defect can then, as in the case of a thickened gauge band, be reduced causing a localized increase in the relative viscosity of the material and a corresponding localized decrease in the mass flow rate. Gauge correction can be obtained by either heating or cooling the thermal lip parts 13 with good results.

The gauge control concept is particularly well suited for use in an automatic closed loop system controlled by a digital computer previously programmed with a desired web thickness profile. As shown in FIG. 1, such a system includes the aforementioned extrusion die 10, a PDP-8/E computer 18 made by the Digital Equipment Corporation which is connected throuhg analog-to-digital converters 19a and 19b to the output of temperature sensors 15 and the beta-ray scanner 17. Computer 18 receives the input data, compares the information with the desired thickness profile previously programmed into its memory and calculates the amount of electrical power that needs to be supplied to the vernier heater elements 14 to achieve the desired gauge profile. The power is distributed by the computer 18 through a power supply interface 16 which is connected to the heater elements 14 and to a standard 60 cycle, three phase, 220 volt alternating current source. Power supply interface 16 is connected to the heaters 14 and to the computer 18 through solid state switching circuitry which enables the computer 18 to regulate the power level individually and collectively to the heaters 14.

In a preferred method, the computer 18 is programmed to distribute through the power supply interface 16 an initial uniform power level to all the vernier heaters 14. This establishes a heated zone 21 having suface temperatures adjacent the molten polymeric material M about 10° C. above the entrance temperature of the material. As best shown in FIG. 3, movement through the heated zone 21 produces a boundary layer 22 along the top and bottom surfaces of the viscous material M and a higher local mass flow rate. Where a gauge band or streak develops, the control system corrects the defect as follows: The computer 18 receives both the thickness variation signal from the scanner 17 and the temperature from the thermal lip part 13 opposite the defect. The computer 18 then compares the variations in thickness with the desired programmed profile and calculates the amount of correction in the power level necessary to change the mass flow rate of the material M in the defective region in accordance with previously determined values. A power level signal is then transmitted by the computer 18 through the power supply interface 16 to the selected heater element 14. As previously mentioned in the preferred method, the corrected power usually amounts to a reduced input which has the effect of cooling the thermal section 13. This cooled section 13 produces a localized cooling of boundary layer 22, a corresponding increase in the viscosity of the material and a reduced local mass flow rate.

In actual practice, there are several methods of smoothing out a gauge band. The aforementioned technique of reducing power to the heaters 14 in the locale of the gauge band and, thus, decreasing the local mass flow rate has an equally effective counterpart. The thickened gauge band may also be smoothed out by increasing power to all the thermal lip parts or sections 13, except those opposite the gauge band, thereby redistributing the excess flow of the gauge band substantially across the extrusion orifice 12. The method of smoothing out gauge bands will depend on the amount of gauge correction, the existing set of extrusion conditions, including extrusion rate, draw rate and accuracy of gauge. Thus, it will be seen that surface defects (resembling peaks and valleys) are readily corrected by either heating or cooling the thermal sections 14, selectively.

In the preferred embodiment the extrusion die 10 comprises top and bottom body members 23 and 24 which are essentially rectangular-shaped blocks made of a dimensionally stable metal alloy suitably doweled and bolted together along a common interface, not shown.

Along the interface, the die 10 is provided with a polymer passageway 29 that terminates downstream as the narrow elongated extrusion orifice 12. The passageway 29 consists, in sequence, of an inlet and distribution header, not shown, a flattened preland 31 and, finally, a constricted land 32. The distribution header, of a type known to the art, performs the function of distributing the molten polymer across the width of the die. Preland 31 performs the function of insuring substantially unidirectional flow (i.e., machine direction flow) of the material M prior to extrusion; while the land 32 establishes the basic gauge of the web W of material extruded through the extrusion orifice 12. By establishing such unidirectional flow in the preland 31, the subsequent selected heating of the required lane of the molten material is made possible since its location can be determined by in-line reference to the deviating lane in the film.

The passageway 29 is connected to a continuous source of molten polymer (not shown) from which suitable polymeric compositions such as polypropylene, polyethylene, polyamides and, preferably, polyesters are readily processed through the die.

The extrusion orifice 12 essentially is defined by inner surfaces 35' and 36' of the die lips 11 (for clarity the upper and lower die dips are also designated as 35 and 36) which, in turn, define the preland 31 and the land 32. Adjustment bolts, as known to the art, may be used for preliminary gauge adjustments, if required.

Each die lip 35 and 36, as previoously described, is divided into a plurality of closely spaced lip thermal sections or parts 13 each containing ¼" diameter cartridge-type resistance heaters 14. Each thermal lip part 13 is separated or isolated from its neighboring lip part by a narrow open slot or air space 41. Adjacent each heater 14 is the thermocoupletype temperature sensor 15. In the preferred embodiment, a 20-inch long orifice 12 contains fifty-two thermal sections 13.

Figure 2:
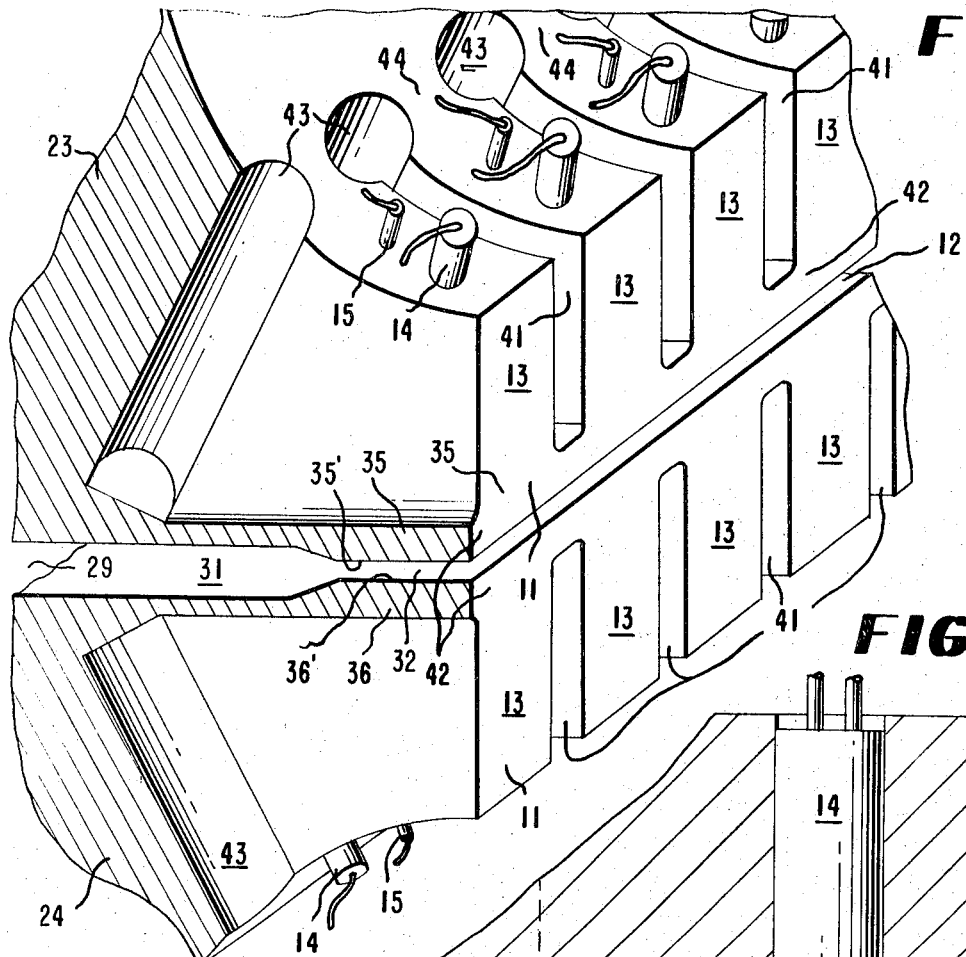
FIG. 2 is an isometric view of a preferred embodiment of the extrusion die of this invention (with parts omitted for clarity) showing thermal die lip parts separated by dead air spaces and minimum thickness sections along the die lips which serve thermally to isolate the thermal lip parts from each other and the main body of the die.

As best shown in FIG. 2, each lip thermal part 13, for all intents and purposes, is thermally isolated from other lip parts by lip parts isolating means (i.e., the slots 41) which extend into the lips 35 and 36 until only a thin rib or lip section connecting means or parts 42 connects the adjacent lip parts 13 thereby defining the continuous lip surfaces 35' and 36'.

At the base of each isolated lip part 13, the air spaces or slots 41 terminate into enlarged circular apertures 43, each of which is separated from the other by a thin rib 44.

The connecting parts 42 maintain the lip parts 13 as an integral part of the respective lips and assure that a smooth continuous surface 35' or 36' is exposed to the molten material M. Conversely, the ribs 44 serve as heat dams to reduce the heat flux into the main body of the die. This is a critical feature of the apparatus and method of this invention for without the interposed dead air spaces 41 and the reduced ribs or connecting parts 42 and 44 the outputs of the heater elements 14 would be rapidly dissipated into the main portions of the body members 23 and 24 of the die and into adjacent lip parts producing diminished lane resolution and prohibitively long response time. With the aforementioned configuration, the temperature of a typical thermal lip part 13 can be varied by as much as 25° C. before a 1° C. rise is attained in the adjacent lip parts.

The specific conditions employed in the extrusion apparatus of this invention depend on the nature of the material being extruded, as are known to the art. For example, in extruding polyethylene terephthalate material, the conditions required for doing this are set forth in U.S. Pat. 2,828,421, which patent is incorporated herein by reference.

Figure 5:
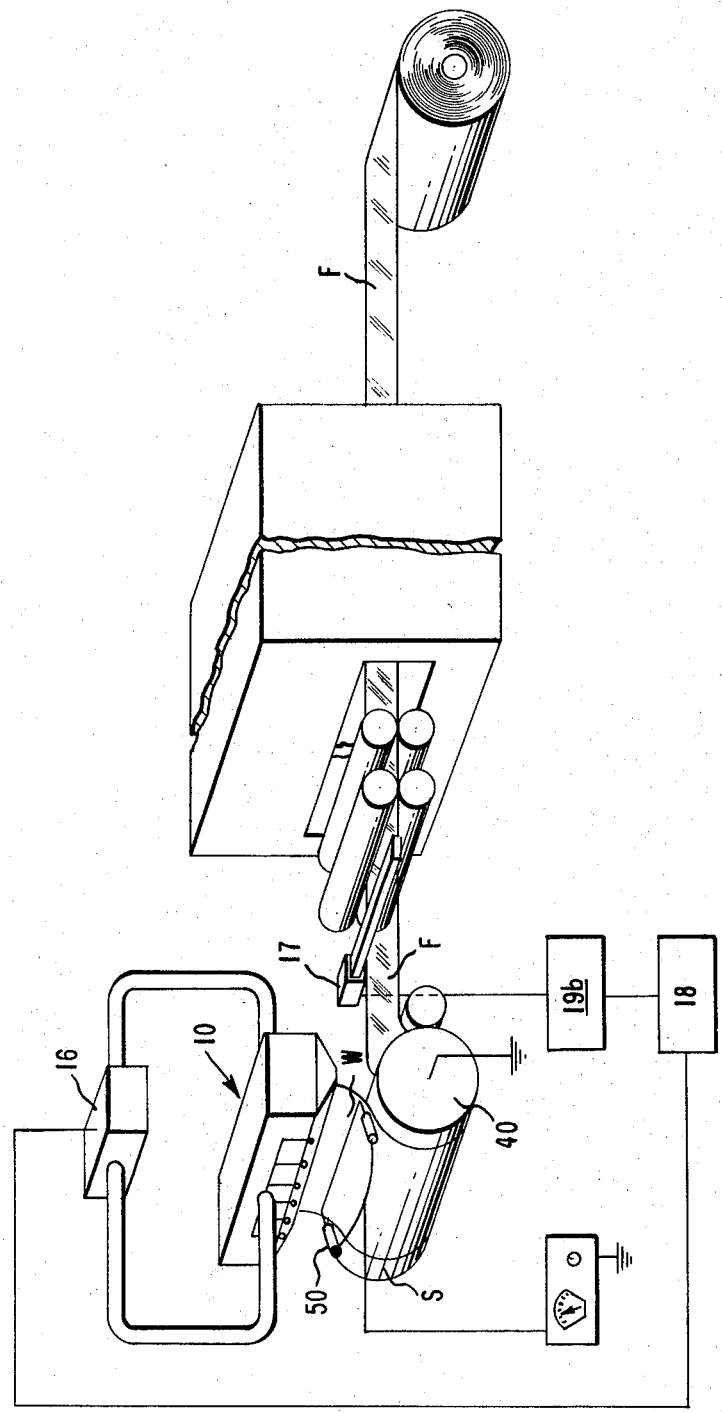
FIG. 5 shows an extrusion die of this invention with full web width pinning means, along with known parts of a film making apparatus including machine and cross-machine film stretching means and web windup means.

While the extrusion apparatus described above can be satisfactorily employed in casting a web of film at slower rates, higher production rates may require selected pinning means as adjuncts for effective quenching and gauge profile control, as described in copending application (F–2396) Ser. No. 280,888, filed Aug. 15, 1972, now abandoned. In the invention of such application, the web of material W is fully pinned across its width, as by an electrostatic pinning wire extending across the full width of the web, as disclosed in U.S. Pats. 3,223,757 and 3,068,528, or by a pneumatic pressure pinning method as disclosed in copending patent application Ser. No. 232,763 of Huskey et al., filed Mar. 8, 1972. In methods employing these types of quenching assists, generally designated 50, the web W is sufficiently well anchored throughout its width to a typical moving quenching surface S (i.e., to quenching surface S of quenching drum 40, as shown in FIG. 5) to prevent any transverse movement of the polymer mass. This assures that the location of the proper lane or lanes in the molten material may be accurately determined by in-line reference to the deviating film lane or lanes. Thus, the response to the corrective action of a thermal gradient is essentially that which would be expected from viscosity changes in the flowing polymer.

The following examples show quantitatively the degree of gauge control obtainable by the vernier heated lip concept. Each example describes a series of tests made with a standard flat sheet extrusion die similar to a Series 102 unit manufactured by F. W. Egan Company. The die was connected to a continuous source of molten polyethylene terephthalate polymer and operated in a normal manner in conjunction with a chilled rotary casting drum. The vernier heating concept of this invention was only incorporated at the mid-center region of the upper die lip as thirteen thermal lip parts spaced ⅜ inch apart. Each lip part or section was thermally isolated from the next in the manner previously described and was adapted with a cartridge type heater and thermocouple sensor. The heaters were connected to independently controlled power units similar to the type manufactured by the Electronics Control Systems, Inc. At start-up, prior to measurement of the film, the extrusion orifice opening of the die was mechanically adjusted to a 60-mil gap height. Polymer throughput was adjusted at 400 pounds per hour under a shear rate of 230 reciprocal seconds across the land portion of the die. The drum on which the molten web was solidified was adjusted to a speed of 31 yards per minute so as to induce an approximate 10:1 draw ratio and thereby form a 0.007 inch thick cast film. These settings were then held constant for each test run which are described below.

EXAMPLE 1

Initial casting of the film was commenced with the heater power off so that the die and die lips were stabilized at 285° C. with power to the vernier heaters off. A profile trace of the cast film thickness was determined. The trace was obtained by an electromicrograph type thickness gauge similar to the type manufactured by the Pratt & Whitney Company. Heaters H–1 through H–3 were then energized raising the temperature of each heated lip part to about 20° C. above the initial temperature of the molten polymer. After the system stabilized at these conditions, a gauge profile trace was made of the cast film. The power level to heaters H–5 through H–9 was then adjusted to increase the temperature of the corresponding lip part 10° C. Following a stabilization period of 10 to 15 minutes, a profile trace of the cast film was made. The power level to heaters H–5 and H–9 was again readjusted raising the lip temperature another 10° C. increment and another profile trace of the cast film was made. The above procedure was repeated at 10° C. intervals until a final lip temperature of 400° C. was attained. After obtaining a final profile trace, the power level to heaters H–1 through H–13 was then cut back, lowering the temperature of the lips to 315° C.

Analysis of the profile traces showed that the 0.007 inch thick cast film increased at the mid-section (directly opposite the heated lip portion) in thickness 0.00093 inch, a 13.3% increase over a 115° C. change in temperature. This represents an average change in gauge of 0.11% per ° C. temperature rise that can be induced by heated lips. The test runs also revealed the rate of heating was nonlinear and rapid with a rate up to 60% goal temperature taking place at 0.344° C. per second and from 60% to 90% goal temperature at a rate of 0.177° C. per second. Conversely, the tests showed the rate of cooling was considerably higher than the heating rate. When the power to the heaters was reduced, the temperature of the lips cooled at a rate of 0.407° C. per second at 60% goal temperature and 0.252° C. per second at 90% goal temperature. The faster cooling rate is believed to be attributed to the high heat absorbing capacity of the molten polymer stream.

EXAMPLE 2

This example illustrates the narrow of fine lane resolution capability of the heated lip concept of this invention. The equipment and casting conditions were substantially identical with those of Example 1.

An initial gauge profile trace of the cast film was made with the heaters off after the die and die lip temperature was stabilized at 285° C. for control purposes. Power to heaters H–1 through H–13 was then turned on and the temperature of the lip elevated to about 330° C. A profile trace of the cast film was then made after the system stabilized. Power to heater H–7 was then raised in incremental amounts so that the temperature of the individual thermal section continually increased. Simultaneously, the temperature of thermal sections corresponding to heaters H–6 and H–8 was monitored. The temperature of the heater H–7 thermal section was raised until a 1° C. change in temperature of heaters H–6 and H–8 was detected. This test shows that a temperature differential of 25° C. could be imposed between adjacent thermal lip sections or parts without a disturbing influence greater than 1° C. Thus, at a typical heating rate of 0.11% to 0.22% per ° C., it is possible to induce a 2% to 5% variation in gauge correction from lane to lane.

I claim:

1. A method of improving the thickness uniformity of a web polymeric film including the steps of:
    transforming molten polmeric material within an extrusion die into a unidirectional flow stream;
    passing the stream between a narrow temperature zone wherein the zone is adjacent the extrusion orifice of an extrusion die having die lips including a plurality of closely spaced, thermally isolated and independently controlled lip parts;
    extruding the molten polymeric material from the extrusion orifice in the form of a web of polymeric film; and selectively varying the temperature of at least a lip part thereby selectively to control the temperature of the molten polymeric material in response to measurements of web thickness nonuniformities so as to alter the mass flow rate of the molten polymeric material in the required areas and thereby improve gauge uniformity of the web of polymeric film.

2. The method of claim 1 wherein such lip part of the die lips is cooled whereby to cool the molten polymeric material along at least a selected lane thereof.

3. The method of claim 1 wherein such lip part of the die lips is heated whereby to heat the molten polymeric material along at least a selected lane thereof.

References Cited
UNITED STATES PATENTS

| | | | |
|---|---|---|---|
| 3,761,553 | 9/1973 | Richardson | 264—210 R |
| 3,341,388 | 9/1967 | Bunyea | 156—244 |

ROBERT F. WHITE, Primary Examiner

G. AUVILLE, Assistant Examiner

U.S. Cl. X.R.

264—176 R; 425—141, 144